United States Patent [19]

Bell, Jr. et al.

[11] 4,238,660
[45] Dec. 9, 1980

[54] MULTI-LEAD SERVO FEED SYSTEM FOR ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp., New York, N.Y.

[21] Appl. No.: 909,023

[22] Filed: May 24, 1978

[51] Int. Cl.³ .............................................. B23P 1/12
[52] U.S. Cl. ................................. 219/69 G; 219/69 C
[58] Field of Search ................. 219/69 G, 69 C, 69 S; 324/102

[56] References Cited

U.S. PATENT DOCUMENTS

| | | | |
|---|---|---|---|
| 2,783,411 | 2/1957 | Matulaitis | 219/69 G |
| 2,822,514 | 2/1958 | Winfield | 324/102 |
| 3,732,392 | 5/1973 | Verner | 219/69 G |
| 3,775,578 | 11/1973 | Verner | 219/69 G |
| 4,021,635 | 5/1977 | Losey et al. | 219/69 C |

Primary Examiner—B. A. Reynolds
Assistant Examiner—Clifford C. Shaw
Attorney, Agent, or Firm—Harry R. Dumont

[57] ABSTRACT

A servo feed control system providing arc sensing for each individual lead in a multiple lead set up. The lowest arc voltage of the several leads in the system determines the feed of the servo system through a hydraulic servo system or the like. Included are a pair of analog switches one of which is actuated responsive to gap polarity so that the system is conditioned to operate with equal facility at either gap polarity.

4 Claims, 4 Drawing Figures

MULTI-LEAD SERVO FEED SYSTEM FOR ELECTRICAL DISCHARGE MACHINING APPARATUS

BACKGROUND OF THE INVENTION

A servo feed system has long been required in the electrical discharge machining field in which the known diode "OR" gate set up such as is shown in Matulaitis U.S. Pat. No. 2,783,411 issued on Feb. 26, 1957 for "Servo Feed for Multiple Electrodes" is improved in that the operating diodes array of the system are controlled in their conductivity to eliminate noise signals and more particularly to eliminate common mode voltages generated in the work cables. The present invention represents a substantial advancement over the prior art in this respect.

In the following specification when I refer to "electronic switch", I mean any electronic control device having three or more electrodes comprising at least two principal or power conducting electrodes acting to control current flow in a power circuit, the conductivity between the principal electrodes being controlled by a control electrode within the switch whereby the conductivity of the power circuit is controlled statically or electrically without movement of mechanical elements within the switch. Included within the definition are transistors in which "turn-on" is accomplished by a control voltage applied to the transistor control electrode and in which "turn off" is accomplished automatically in response to removal of that control voltage. Also included in the definition are devices of the gate type in which "turn-on" is accomplished by a control voltage applied to the control electrode, which control voltage may then be removed and in which "turn-off" is accomplished by the application of a subsequent control voltage to the control electrode.

An additional class of electronic switches, called "electronic trigger devices", falls within this definition and includes ignitrons, thyratrons, semi-conductor controlled rectifiers and the like. By "electronic trigger devices", I mean any electronic switch of the type which is triggered "on" at its control electrode by a voltage pulse and is turned "off" by a reverse voltage applied for a sufficient time period across its principal electrodes.

It will be understood that the present system will operate effectively, for example, when there is included in the EDM power supply a free running multivibrator or a pulse generator of the digitally controlled type, preferably including a counter and a digital control system such as the type shown and described in my U.S. Pat. No. 3,809,847 for "Method and Apparatus for Electrical Discharge Machining", issued on May 7, 1974. In that patent, there is shown a system whereby the desired "on" times and "off" times can be separately dialed and selected by the operator on decimal type thumb wheel switches which switches then furnish a continuing visual indication of the "on"–"off" times of the machining operation currently being carried on. Such a digital type pulse generator is particularly suitable for incorporation with the system of the present invention.

BRIEF DESCRIPTION OF THE INVENTION

The present invention includes a servo feed system in which arc or gap signals are utilized and properly controlled from a plurality of different electrode-workpiece gaps. In order to provide for the appropriate polarity of signals in accordance with the preset gap polarity, an array of diodes for each polarity is included in conjunction with a separate analog voltage switch for each polarity. One or the other of the switches is energized responsive to the polarity preset for the machining operation. Each of the several gaps provided is preset with respect to its gap voltage and any time one of the several electrodes goes into a shorted condition, the servo feed system will make an appropriate reaction to provide back-up of the multiple set or array of electrodes.

It is important in our invention that there is no hard and fast limit to the number of electrodes and the number of leads which may be included in the gap set-up. While the present invention is described with respect to a four electrode set-up, as many as twenty or more outputs can be tied together in an efficient operating set-up. A substantial improvement is realized in that polarity can be switched at the several arcs without requiring the use of a plurality of relay switches which otherwise would have to be internally operated in the circuit. The output signal for control of the servo is a relatively slowly varying and stable signal which is effective in servo feed systems.

BRIEF DESCRIPTION OF THE DRAWINGS

The present invention with its operational features, advantages and objectives, will be understood from the following specification taken together with the drawings wherein.

DETAILED DESCRIPTION OF THE PREFERRED EMBODIMENT

Figure 1:
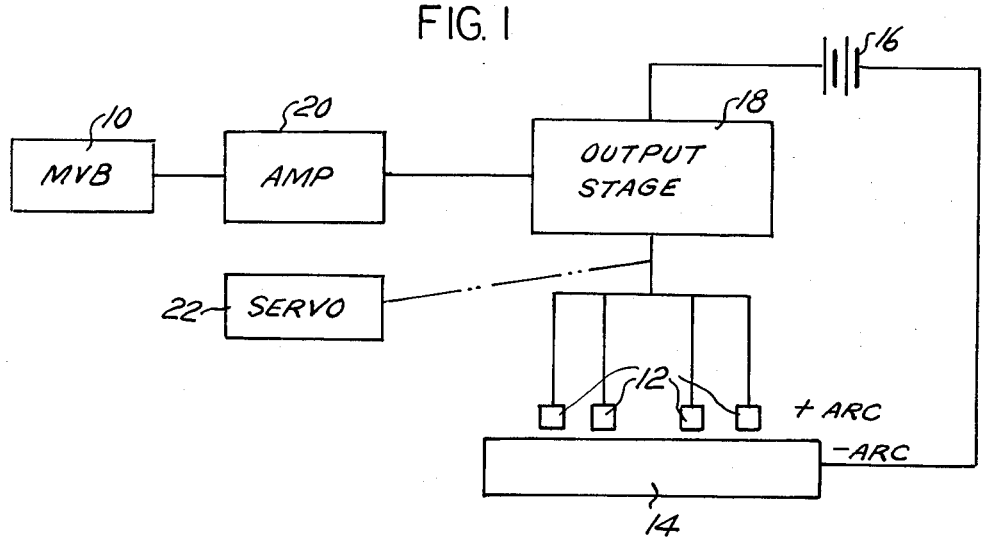
FIG. 1 is a block diagrammatic representation of a multi lead EDM setup in which the present invention is adapted to be incorporated.
Figure 4:
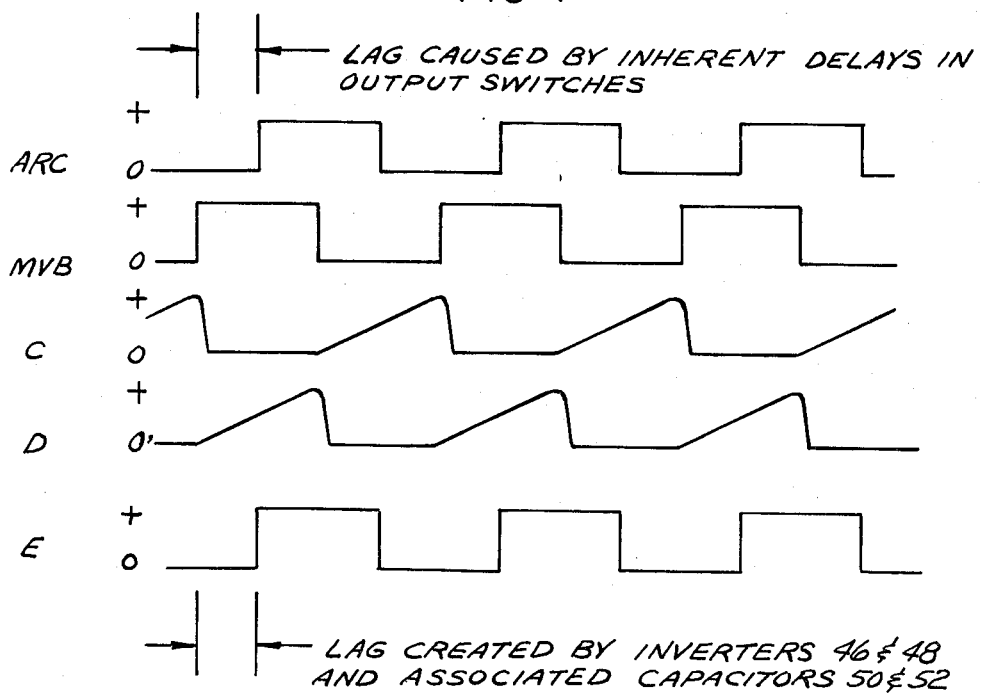
FIG. 4 is a gap voltage waveform diagram illustrating the mode of operation of the lag voltage portion of the schematic of FIG. 2.

FIG. 1 shows the basic parts of an electrical discharge machining apparatus in which the pulse generator or multivibrator 10 is used to control the frequency and "on"–"off" times of machining power pulses furnished to the machine gap between a plurality of electrodes 12 and an opposed workpiece 14. A DC power source 16 is connected in series with an output stage 18 and the gap to provide machining power pulses thereacross in accordance with the well known principles of electrical discharge machining. FIG. 1 shows reverse polarity with the electrodes 12 positive relative to the workpiece 14. The output stage 18 normally includes a bank of switches comprising a number of electronic switches such as transistors which are turned "on" and "off" by a train of triggering pulses from the multivibrator 10 with a frequency and "on"–"off" time preset in accordance with the finish and detail required for the cavity or openings to be made in the workpiece 14. One or more suitable intermediate amplifying and pulse forming stages 20 are included in the circuit.

Also shown in FIG. 1 is a servo control system 22 which operates to control the upfeed or downfeed of the plurality of electrodes 12. It will be understood that the electrodes 12 are customarily mounted on the ram of a machining tool which is then operated through an electrical or electro-hydraulic servo feed mechanism for controlling the servo feed during machining.

Figure 2:
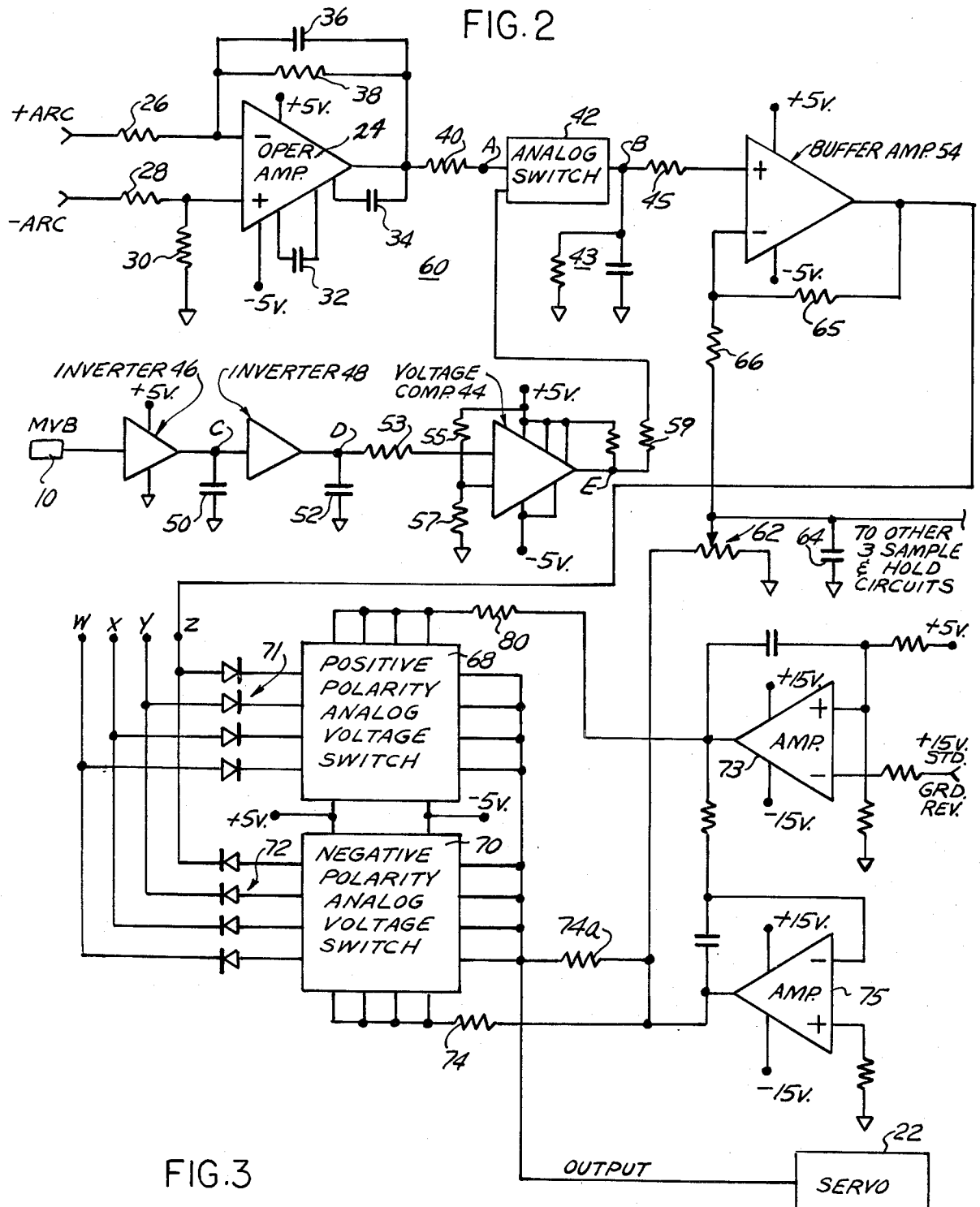
FIG. 2 is a combined schematic and block diagrammatic representation of the present invention.

FIG. 2 shows in greater detail the circuit which is used to respond to gap voltage condition and then control the servo feed of the EDM apparatus. Included as one of the basic elements in the circuit of FIG. 2 is an operational amplifier 24. It will be seen that the operational amplifier 24 has two inputs provided from the plus arc and minus arc input leads. In series with each of these input leads are resistors 26 and 28. A further resistor 30 is connected to ground as shown. Operating voltages are provided for the operational amplifier 25 as shown with external timing capacitors 32 and 34 and an external RC time constant network including capacitor 36 and resistor 38. It will be seen that the output of the operational amplifier 24 is representative of the arc voltage and is a pulse showing the arc voltage decay either in a positive or a negative direction, depending on the preset polarity of the arc. This voltage is developed across a series resistor 40 and is shown in FIG. 3 in the left hand voltage waveform diagram that is labeled at its left hand end point "A".

The next following operating element in the circuit is an analog switch 42 which may be, for example, of the type currently commercially made and sold by the Motorola Semiconductor Products, Inc. of Phoenix, Arizona under Specification No. MC14016. It will further be seen that the analog switch 42 is turned "on" and "off" through its lower left hand input by the output of a voltage comparator 44. The operation of the comparator 44 and the associated circuitry which is connected between it and the multivibrator 10 forms an important feature of the present invention. As best shown in FIG. 1, one or more stages of amplification 20 are included in the circuit before the final machining power pulses are provided to the gap. As a result, there is a lag of the order of 300 nanoseconds or more in the signal as between that occurring at the gap and the signal outputs from the multivibrator 10. In the absence of an appreciable delay, the multivibrator output signal would come in as though there were no lag provided to it and it would almost instantaneously turn on the analog switch 42. Thus the gap might be still at approximately a zero voltage level and the operational amplifier 24 would be at zero. This does not present a real problem at low frequencies but when the machining operation is carried on at very high frequencies, say, for example, when the "on" time is one microsecond duration, the lag included in the system would necessarily amount to a great portion of the "on" time so that there would be only several hundred nanoseconds left to actually perform the gap sensing function. Thus, if you had, for example, one microsecond "on-time" at the multivibrator 10 and a following lag of 400–500 nanoseconds at the arc, you would have a very short interval of time to do the sensing that is required. The circuit associated with the voltage comparator 44 is thus particularly designed to shift the pulses from the multivibrator 10 as compared to those at the arc and to make them occur substantially on top of each other. RC time constant circuits were found not to be sufficient or effective to provide the required delay. The circuit of FIG. 2 includes a pair of CMOS circuits such as, for example, inverters 46 and 48. These provide with precision the necessary lag in the system. Inverter circuit elements and building blocks of this type are currently manufactured and sold under Specification No. MC14049 by Motorola Semiconductor Products Inc. of Phoenix, Arizona. We have found that the inverters 46 and 48 of this type not only have the inherent delay required but by adding capacitors 50 and 52 to their external circuits the delay can be even further extended and adjusted. There is still an additional important reason for having the combination of the voltage comparator 44 and the inverters 46 and 48 of the type just described. The relatively high impedance input does not overload the inverters 46 and 48 and it is possible to provide delay to the signal until it actually occurs and after the arc has already been on.

Figure 3:
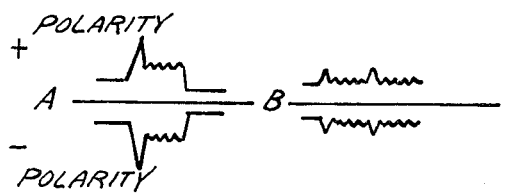
FIG. 3 is a voltage waveform diagram taken at selected points in the schematic of FIG. 2 illustrating the principles and mode of operation of one portion of the inventive circuit.

The output from the analog switch 42 is best shown in FIG. 3 as it occurs at following point B. This output which forms a control output for the next following stage buffer amplifier 54 is a DC voltage of the required polarity with a slight ripple as shown at point B. In the output circuit of the analog switch 42 there is provided an RC discharge time constant network 43 as shown. A signal resistor 45 is connected in series with the plus input terminal of the buffer amplifier 54. In connection with the voltage comparator 44, a signal resistor 53 is connected in series with its plus input terminal and the necessary operating voltages of positive and negative 5 volts with resistors 55 and 57 are included in the circuit as illustrated. A further resistor 59 is connected in series with the output of the voltage comparator 44 and the lower input terminal of the analog switch 42.

The sample-and-hold circuit indicated generally by the numeral 60 includes that portion of the schematic just above it. For the four electrode system illustrated in FIG. 1, there would be provided four such circuits 60. This means that one of each such circuits would be required for each different lead and electrode associated with it, i.e., for each electrode 12 as opposed to the workpiece 14. A single analog circuit as associated with the buffer amplifier 54 would be required. Connections are indicated at the lower right hand portion of the circuit including potentiometer 62 and capacitor 64 to which would be connected the other three sample-and-hold circuits 60 for the other three electrodes 12. Also, with respect to the buffer amplifier 54, there is provided a shunt resistor 65 and a resistor 66 in series with its lower, negative input terminal. The circuit including potentiometer 62 and capacitor 64 functions as a biasing network for the buffer amplifier 54.

The output from the buffer amplifier 54 is passed to the input terminal for a pair of positive polarity analog voltage switches 68 and 70 as shown. These are of the type MC14016 hereinbefore referred to. The outputs for the other three sample-and-hold circuits above referred to but not shown would correspondingly be connected to the input terminals W, X, and Y as shown to the left of the input terminal Z. The inputs to the positive polarity analog voltage switch 68 are provided through a forwardly biased diode array 71. The inputs to the negative polarity analog switch 70 are provided through a back biased array of diodes 72. The diodes in the two arrays 71, 72 provide a means for mixing signals together. Otherwise stated, these provide an analog "or" gate. Only the lowest signal, i.e., the signal closest to ground level, will pass through the two analog switches to the output as labeled on the lowest line of FIG. 2. In a positive polarity condition, we would want to bias switch 68 "on" and this is done through amplifier 73 and the circuitry associated with it.

The function of amplifiers 73 and 75 is to supply gating signals to analog switches 68 and 70. With positive polarity, the input to amplifier 73 is 0 volts which causes the output of 73 to be +15 volts. This gates the analog switch 68 on and causes amplifier 75 output to be −15 volts which gates analog switch 70 off.

With negative polarity, the input to the amplifier 73 is +5 volts which causes the output of the amplifier 73 to be −15 volts. This gates the analog switch 68 off and causes the amplifier 75 output to be +15 volts which gates the analog switch 70 on.

If the gap voltage is negative at electrodes 12, we would want to have a positive output at point W, X, Y and Z and therefore would bias analog switch 70 on. This would be done by putting a pulse voltage through resistor 74a to the lower input terminals of the analog switch 70. This would bias the diodes in diode array 72 with a positive voltage on their anodes. Under these circumstances, we would have a negative electrode 12. In each case, this would give us a positive voltage at terminals W, X, Y, and Z, if we had all open arc conditions on each lead. The diodes in array 72 would have positive anodes. If one of the four arc leads should short, for example the one leading to the point Z, point Z would go to zero voltage level. The upper diode in the diode array 72 would begin to conduct and this would pull the output leads of the analog switch 70 to ground. The output leads at the right hand side of the analog switch 70 would go to ground and the output would be pulled to ground. This tells us that one lead of the four which was in trouble, i.e., with a low voltage representative of a gap short circuit or impending gap short circuit condition.

The biasing network on the buffer amplifier 54 is provided through the network including the resistor 66 and the potentiometer 62. In the case of a positive electrode set-up on electrodes 12, point Z would go negative, and a positive voltage would be placed on the upper hand input terminals of the analog voltage switch 68. This would turn the analog voltage switch 68 on and a negative voltage would result on the right hand output terminals of the analog voltage switch 68 through the resistor 80. This would bias the other four diodes associated with the analog voltage switch 68 with negative cathodes.

The buffer amplifier 54 would then have a negative voltage output for an open arc condition so that the diodes would not be conductive. However, if the arc leads or one of them were to short, the anodes of the diodes would go positive causing the diode to conduct thus pulling the output to ground. The biasing that was provided on the lower input terminal of the buffer amplifier 54 through the resistor 66 now supplies a slight positive bias at point Z which would overcome the voltage drop of the diode array 70 giving us a zero voltage output.

The output voltage shown at the bottom of FIG. 2 is a signal which is then used to control servo feed and in a gap short circuit of any one of the electrodes 12, backup would then be commanded through the operation of the servo system 22 in a manner well known in the EDM art.

In will also be understood that the output signal from the circuit of FIG. 2 might be operated together with an absolute value type circuit such as a pair of operational amplifiers. This could be used as a computer control input to allow for computer servo control if that is provided for.

In will thus be seen that we are provided by our invention a substantially improved and advanced servo feed system for operating in a multi lead servo feed apparatus for EDM.

We claim:

1. A servo feed system for an electrical discharge machining apparatus of the multiple electrode type with reversible gap polarity and including a pulse generator, comprising:
   a plurality of electrodes;
   a like plurality of arc leads, each connected to a different one of said electrodes;
   a first array of parallel connected diodes, each having its anode connected to one of said leads;
   a second array of parallel connected diodes, each having its cathode connected to one of said leads;
   a pair of analog electronic switches, one having its input terminals coupled to the cathodes of said first array and the other having its input terminals connected to the anodes of said second array;
   means for enabling one of said switches responsive to one gap polarity and for enabling the other of said switches responsive to the opposite gap polarity; and
   a servo feed means operatively connected to the output of said switches for controlling the upfeed and downfeed of said electrodes.

2. The combination as set forth in claim 1 wherein said enabling means comprises a DC biasing source operably connected to the control electrode of each of said analog switches.

3. A servo feed system for an electrical discharge machining apparatus of the multiple electrode type with selectively reversible gap polarity and including a machining pulse generator, comprising:
   a plurality of electrodes each connected to a different arc power lead and mounted on a common ram for advancement and retraction movement relative to a workpiece;
   a servo means operatively connected to said ram for controlling its movement responsive to gap voltage level;
   a pair of analog electronic switches, each having a plurality of input terminals and a like plurality of output terminals, its outputs connected to said servo means for controlling its operation;
   each of said analog electronic switches having an array of parallel connected like-poled diodes of like plurality to said electrodes, each diode connected between its associated electrode and a different input terminal of said associated analog switch, said arrays having opposite current conducting poling one relative to the other; and
   means including a presettable DC bias source for enabling one of said analog switches substantially in phase with the operation of said pulse generator.

4. The combination as set forth in claim 3 wherein said enabling means includes an inverter amplifier having one input terminal operably connected to the output of said pulse generator.

* * * * *